(12) United States Patent
Boyce et al.

(10) Patent No.: US 12,470,748 B2
(45) Date of Patent: Nov. 11, 2025

(54) METHODS AND APPARATUS TO IDENTIFY A VIDEO DECODING ERROR

(71) Applicant: Intel Corporation, Santa Clara, CA (US)

(72) Inventors: Jill Boyce, Portland, OR (US); Basel Salahieh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/915,431

(22) PCT Filed: Dec. 11, 2020

(86) PCT No.: PCT/US2020/064438
§ 371 (c)(1),
(2) Date: Sep. 28, 2022

(87) PCT Pub. No.: WO2021/201928
PCT Pub. Date: Oct. 7, 2021

(65) Prior Publication Data
US 2023/0239508 A1 Jul. 27, 2023

Related U.S. Application Data

(60) Provisional application No. 63/004,741, filed on Apr. 3, 2020.

(51) Int. Cl.
*H04N 19/65* (2014.01)
*H04N 19/597* (2014.01)

(52) U.S. Cl.
CPC .......... *H04N 19/65* (2014.11); *H04N 19/597* (2014.11)

(58) Field of Classification Search
CPC ....... H04N 19/597; H04N 19/65; H04N 19/70
(Continued)

(56) References Cited

U.S. PATENT DOCUMENTS 11,627,314 B2 * 4/2023 Tourapis .............. H04N 19/184
375/240.18
11,727,603 B2 * 8/2023 Mammou ................. G06T 9/00
382/233

(Continued)

FOREIGN PATENT DOCUMENTS

JP 2008011535 A 1/2008
JP 2013038812 A 2/2013

(Continued)

OTHER PUBLICATIONS

Suehring et al., "AHG17: Decoded Picture Hash SEI", Joint Video Experts Team (JVET), JVET-N0706, MPEG, 14th Meeting, Mar. 19-27, 2019, 1 page.

(Continued)

*Primary Examiner* — Behrooz M Senfi
(74) *Attorney, Agent, or Firm* — Hanley, Flight & Zimmerman, LLC

(57) ABSTRACT

Methods, apparatus, systems and articles of manufacture to identify a video decoding error are disclosed. An example apparatus includes an atlas generator to generate atlas data for one or more atlases generated from input views of video; a hash generator to: perform a hash operation on the atlas data to generate a hash value; and include the hash value in a message; and a multiplexer to combine the one or more atlases, coded atlas data corresponding to the atlas data, and the message to generate a video bitstream.

25 Claims, 5 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 2007/0157070 | A1 | 7/2007 | Wenger |
| 2017/0347122 | A1 | 11/2017 | Chou et al. |
| 2018/0268570 | A1 | 9/2018 | Budagavi et al. |
| 2018/0334454 | A1 | 11/2018 | Lanman |
| 2019/0371051 | A1* | 12/2019 | Dore .................. G06T 7/90 |
| 2021/0006833 | A1* | 1/2021 | Tourapis .............. G06T 7/10 |
| 2021/0183109 | A1 | 6/2021 | Chevet |
| 2021/0272323 | A1 | 9/2021 | Ricard |
| 2021/0407139 | A1* | 12/2021 | Graziosi .............. H04N 19/119 |
| 2023/0156229 | A1* | 5/2023 | Boyce ................. H04N 19/117 |
| | | | 375/240.02 |

FOREIGN PATENT DOCUMENTS

| | | | | |
|---|---|---|---|---|
| JP | 2020515937 | A | | 5/2020 |
| JP | 2021518694 | A | | 8/2021 |
| JP | 2021530890 | A | | 11/2021 |
| KR | 20080079669 | | | 9/2008 |
| KR | 20110064487 | | | 6/2011 |
| KR | 20110064487 | A | * | 6/2011 ............ H04L 12/26 |
| KR | 20190105011 | | | 9/2019 |
| WO | 2018130491 | A1 | | 7/2018 |
| WO | 2018217651 | A1 | | 11/2018 |
| WO | 2019051291 | A1 | | 3/2019 |
| WO | 2019199531 | A1 | | 10/2019 |
| WO | 2020014319 | A1 | | 1/2020 |
| WO | WO-2020013975 | A1 | * | 1/2020 ........... H04N 13/117 |
| WO | WO-2020127226 | A1 | * | 6/2020 ....... H04N 21/21805 |
| WO | WO-2021176133 | A1 | * | 9/2021 ........... H04N 13/161 |

OTHER PUBLICATIONS

ISO/IEC JTC, "V-PCC Codec Description," Motion Picture Expert Group Meeting, ISO/IEC JTC 1/SC 29/WG 11, Nov. 13, 2019, 66 pages.

Graziosi et al., "[V-PCC] [New] Decoded Atlas Information Hash SEI Message for V3C/V-PCC," Motion Picture Expert Group, ISO/IEC JTC1/SC29/WG11, Jun. 2020, 12 pages.

International Searching Authority, "International Preliminary Report on Patentability," issued in connection with International Patent Application No. PCT/US2020/064438, issued on Sep. 29, 2022, 5 pages.

European Patent Office, "Extended European Search Report," issued in connection with European Patent Application No. 20928116.1-1208, dated Dec. 12, 2023, 10 pages.

ISO/IEC, "Information Technology—Coded Representation of Immersive Media—Part 5: Visual Volumetric Video-Based Coding (V3C) and Video-Based Point Cloud Compression," ISO/IEC JTC 1/SC 29/WG 11, 2020, 305 pages.

ISO/IEC, "Committee Draft of MPEG Immersive Video," ISO/IEC JTC 1/SC 29/WG 11, Jul. 3, 2020, 82 pages.

Salahieh et al., "Test Model 6 for MPEG Immersive Video," ISO/IEC JTC 1/SC 29/WG 11, Jul. 25, 2020, 39 pages.

ITU, "Series H: Audiovisual and Multimedia Systems," International Telecommunication Union, Recommendation ITU-T H.265, Nov. 2019, 712 pages.

International Searching Authority, "International Search Report and Written Opinion," issued in connection with PCT Application No. PCT/US2020/064438, dated Apr. 5, 2021, 7 pages.

Hellman et al., "Changes to the Hash SEI calculation for improved usability," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, JCTVC-I0218v2 [online], 11 pages.

Salahieh et al., "Test Model 5 for Immersive Video," Video, Approved WG 11 document, dated May 16, 2020, [Virtual], 35 pages.

Japanese Patent Office, "Search Report," issued in connection with Japanese Patent Application No. 2022-552873, dated Nov. 26, 2024, 39 pages. [English Translation Included].

Japanese Patent Office, "Decision to Grant a Patent," issued in connection with Japanese Patent Application No. 2022-552873, dated Dec. 10, 2024, 5 pages. [English Translation Included].

Intellectual Property India, "Examination Report under sections 12 & 13 of the Patent Act, 1970 and Patents Rules, 2003," issued in connection with Indian Patent Application No. 202247050259, dated Jun. 13, 2025, 6 pages.

\* cited by examiner

METHODS AND APPARATUS TO IDENTIFY A VIDEO DECODING ERROR

RELATED APPLICATION

This patent claims the benefit of U.S. Provisional Application No. 63/004,741, which was filed on Apr. 3, 2020. U.S. Provisional Application No. 63/004,741 is hereby incorporated herein by reference in its entirety. Priority to U.S. Provisional Application No. 63/004,741 is hereby claimed.

FIELD OF THE DISCLOSURE

This disclosure relates generally to video processing, and, more particularly, to methods and apparatus to identify a video decoding error.

BACKGROUND

In video compression/decompression (codec) systems, compression efficiency and video quality are important performance criteria. For example, visual quality is an important aspect of the user experience in many video applications. Compression efficiency impacts the amount of memory needed to store video files and/or the amount of bandwidth needed to transmit and/or stream video content. A video encoder typically compresses video information so that more information can be sent over a given bandwidth or stored in a given memory space or the like. The compressed signal or data is then decoded by a decoder that decodes or decompresses the signal or data for display to a user. In most examples, higher visual quality with greater compression is desirable.

Currently, standards are being developed for immersive video coding and point cloud coding including the Video-based Point Cloud Compression (V-PCC) and MPEG Immersive Video Coding (MIV). Such standards seek to establish and improve compression efficiency and reconstruction quality in the context of immersive video and point cloud coding.

Figure 1:
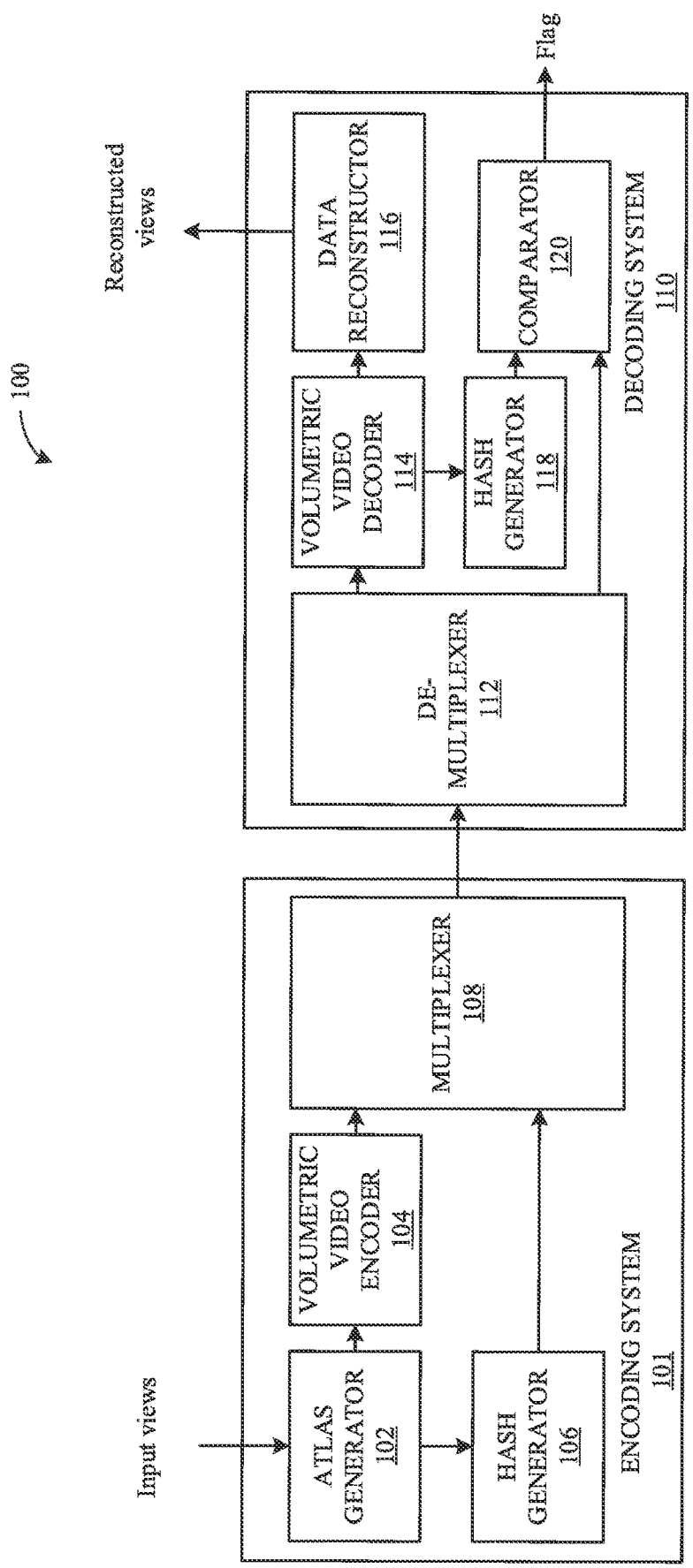
FIG. 1 is an example environment for encoding and/or decoding video in conjunction with examples disclosed herein.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In the context of immersive video coding and point cloud coding, video standards such as the Visual Volumetric Video-based Coding (V3C) and Video-based Point Cloud Compression (V-PCC) and the MPEG Immersive Video Coding (MIV) may be utilized. For such standards, there may be requirements to confirm that a decoder is conforming to such standards. For example, there may be one or more requirements that the decoder is obtaining unaltered and/or uncorrupted bitstreams, and/or that the decoder is correctly decoding obtained bitstreams.

In V3C/V-PCC, dynamic point clouds are compressed using multiple projections of point clouds onto planes for texture, such as color, and for geometry, such as depth. After the dynamic point clouds are compressed, the compressed dynamic point clouds are segmented to extract rectangular regions, as referred to as patches of similar depths from the projection plane. The patches are packed into atlases or atlas tiles with an occupancy map. The occupancy map indicates parts of the atlases that are to be used (e.g., occupied regions within the patches packed in the atlases). Additionally, patch information metadata is used to indicate how patches are mapped between the projection plans and the canvas (e.g., atlases or atlas tiles). A two dimensional (2-D) video codec, such as high efficiency video coding (HEVC), is used to exploit the spatial and temporal redundancy of geometry and texture components of the canvas. The information about the sizes and positions of the patches in the original projections and in the atlases or atlas tiles are signaled as coded atlas tile data. Occupancy information is also signaled. The atlas can be subdivided into a grid of non-overlapping blocks of data, and the block size may be included in the bitstream. The atlas data includes a patch value per block indication (e.g., a patch identification and/or index of a block of data). The block may correspond to the patch or may be a subset of the patch. In some examples, patches overlap with other patches. The order in which the patch data is signaled in the bitstream (e.g., which corresponds to the patch identifier) is used to determine the patch precedence at a particular block location, for example, the patch of the higher patch identifier value may take precedence.

In coding via the V3C/V-PCC and MIV standard, rectangular patches are formed from projected views and arranged into atlases. Patches may overlap within an atlas, and the last signaled patch takes precedence for resolving overlaps. The standards define a signaling mechanism to send, for each patch in an atlas, coded atlas data including information including the size and position of the patch in its corresponding projected view and/or a patch identifier. Atlas data is a mapping of blocks of data to patches in each atlas. In some examples, such information is included within a coded atlas tile data syntax structure. Coded atlas data is a per patch signaling. Coded atlas data can be decoded by a decoder to obtain the atlas data. In some examples, the coded atlas tile data syntax structure is signaled at each frame time or instance. In some examples, the coded atlas tile data syntax structure persists for multiple consecutive frame time or instance. Multiple coded atlas tile data syntax structures, corresponding to different atlases or atlas tiles, may be signaled within the same access unit (a portion of components of the bitstream (e.g., atlas data, texture video, geometry video, occupancy video, etc.) that have the same decoding order count (e.g., data of the V-PCC/MIV bitstream that corresponds to a particular time instance)), all of which correspond to the same frame time, instance, or Picture Order Count (POC) value. For example, a standard may define an operation to calculate atlas data (e.g., a variable 2-dimensional array, BlockToPatchMap[y][x] (also referred to as a DecoderToPatchMap[y][x])), that represents a mapping of blocks in the atlas space to corresponding patches, where x and y are coordinates of the block at a block size granularity. The coded atlas data is included in a bitstream from an encoder to a decoder.

The MIV standard uses a similar approach for coding multiple image views that V3C/V-PCC uses for its multiple projections. For example, multiple atlases may be used for MIV. In MIV, the arrangement of patches into atlases may persist for multiple frame times. Conformance checking can be utilized for multiple atlases, and for persistence of atlases. Persistence corresponds to how long data corresponding to the atlases can persist before the data is to be replaced by additional data.

In examples disclosed herein, a supplemental enhancement information (SEI) message including an atlas data hash is provided. Such a message may be implemented in the MIV standard, the V3C/V-PCC standard, and/or any other standard that generates messages included in bitstreams. The atlas data hash (also referred to as hashed atlas data) is the result of a hash operation performed on atlas data. Examples disclosed herein include atlas data hash in the SEI message and include the SEI message in the bitstream with the coded atlas data. The decoder uses the hash atlas values of the SEI message to help a decoder identify a transmission and/or decoding error, as further described below.

As described above, examples disclosed herein include the hashed atlas data (e.g., a hash value per atlas of the per block indication of the patch that takes precedence for that block, or of which view or projection direction the patch represents) in a supplemental enhancement information (SEI) message in the bitstream along with the corresponding coded atlas data. The hashed atlas data may include a hash per atlas for the 2-dimensional array variable BlockToPatchMap[y][x]. For example, a hash function may be applied to scanned (e.g., raster scanned) atlas data such that the atlas data is a 2-dimensional data structure of numerical values indicative of a patch identifier (e.g., number) or view identifier to which a particular sample corresponds. In some examples, an encoder determines the values of BlockToPatchMap[y][x] for each atlas at each access unit for which patch data is signaled in the coded atlas tile data. The hash function may be implemented as one or more hash operations. In some examples, an encoder generates a hash value for the entire 2-dimensional array, and signals the atlas data hash value in the SEI message.

In examples disclosed herein, when a decoder receives a coded bitstream, the decoder separates the SEI message from the bitstream. The decoder determines the atlas hash values from the SEI message. Additionally, the decoder decodes, for each coded atlas in each access unit, the coded atlas data (e.g., the values of the BlockToPatchMap[y][x] 2-dimensional array to generate decoded atlas data. After the decoder decodes the coded atlas data, the decoder generates a hash value for the decoded atlas data (e.g., BlockToPatchMap[y][x] 2-dimensional array) using the same hashing techniques implemented by the encoder to generate a decoder-side hash value. In this manner, the decoder compares the decoder-side hash value with the hash value signaled in the SEI message. If the values match, the decoder verifies with a high confidence that the bitstream was not corrupt and the decoder operation for decoding the coded atlas tile data conforms the specification (e.g., verifying that the decoder is correctly decoding). If the values do not match, the decoder may determine that a decoding error occurred (e.g., the bitstream was corrupt and/or the decoder operation was not conformant to the specification with respect to decoding the coded atlas tile data).

As provided herein, a decoded atlas data hash and atlas data hash are generated for use in video coding and for use in a standardized codec such as the V3C/V-PCC standard and/or the MIV standard. The SEI message may signal a hash value per atlas data instance (e.g., for each unique 2-dimensional atlas array).

FIG. 1 is an example environment 100 including an example block diagram of an example encoding system 101 and an example decoding system 110. The example encoding system 101 includes an example atlas generator 102, an example volumetric video encoder 104, an example hash generator 106, and an example multiplexer 108. The example decoding system 110 includes an example demultiplexer 112, an example volumetric video decoder 114, an example data reconstructor 116, an example hash generator 118, and an example comparator 120.

The example encoding system 101 (also referred to as encoder, encoding device, etc.) of FIG. 1 and the example decoding system 110 may be implemented in any suitable form factor device or one or more of such devices including a server computer, a cloud computing environment, personal computer, a laptop computer, a tablet, a phablet, a smart phone, a gaming console, a wearable device, a display device, an all-in-one device, a two-in-one device, etc. Although the example encoding system 101 and the example decoding system 110 of FIG. 1 is implemented in different computing devices, the example encoding system 101 and the decoding system 110 may be implemented in the same device.

The atlas generator 102 of encoding system 101 of FIG. 1 receives multiple views of input video to encode. There may be any number of views of a scene and each one of the views may include a corresponding texture picture or frame (or texture video) and a corresponding geometry picture or frame (or geometry video). For each time instance, video data for one or more views of a scene are provided such that multiple texture frames and multiple depth or geometry frames may be generated. For example, each texture frame may include per pixel color information such as brightness/color (YUV) data, red green blue (RGB) data, or similar data and each geometry or depth frame may include per pixel depth data or similar data. The texture and geometry frames may have the same or differing resolutions. For example, the texture frames may be video graphics array (VGA), high definition (HD), Full-HD (e.g., 1080p), 4K resolution video, 8K resolution video, or the like. Example disclosed herein are described with respect to frames and pictures (which are used interchangeably).

The example atlas generator 102 of FIG. 1, for a particular frame index or instance, generates (e.g., converts from the input views) a texture atlas and a geometry or depth atlas. For example, the atlas generator 102 breaks down each of the multiple views into patches (e.g., rectangular regions) that are arranged to form an atlas. The atlas generator 102 may format the atlas to reduce redundancy among the multiple views. The example atlas generator 102 forms a texture atlas (including texture information) and a geometry or depth atlas (including geometry or depth information) and provides the data to the volumetric video encoder 104 of encoding system 101.

The example atlas generator 102 of FIG. 1 also determines, for the particular frame index or instance, atlas data that includes metadata indicating the source of each patch (e.g., the corresponding view associated with that patch) in the texture and the depth atlas. In some examples, the atlas generator 102 generates a single instance of atlas data for the texture and depth atlases such that the patches of the depth atlas follow or match the patches of the texture atlas, and vice versa. The atlas data provides metadata for the reconstruction of the multiple views (or portions thereof) using the texture and depth patch data in the atlases. As used herein, the term atlas data indicates any data structure indicative of the sources of patches of the texture and depth atlases, such as 2-dimensional array of numerical values indicative of the source of such patches. In some examples, the atlas data includes a 2-dimensional array of pixel-wise numerical values each representative of a patch identifier (or a default value (e.g., as the highest available value in the data structure) if the pixel does not correspond to a patch. In some examples, the atlas generator 102 generates the atlas data to include a 2-dimensional array of pixel-wise numerical values each indicative of a source view of the pixel (or a default value if the pixel does not correspond to a source view). In some examples, the atlas generator 102 generates the atlas data to include a 2-dimensional array of pixel-wise numerical values each indicative of a source view and patch number of the pixel (or an default value if the pixel does not correspond to a source view). In some examples, the 2-dimensional array of data may be represented in a 1-dimensional format (e.g., by listing all of the data of the 2-dimensional array into a 1 dimensional vector), such as would be created in a raster scan operation. In some examples, the atlas generator 102 generates the atlas data using a DecoderToPatchMap[y][x] syntax element as further described below.

In some examples, the atlas generator 102 generates an atlas data instance, as shown with respect to the pseudocode provided in Table 1 below. In the pseudocode of Table 1, the atlas data is DecoderToPatchMap[y][x] (also referred to as BlockToPatchMap[y][x].

TABLE 1

Psuedocode(1)

```
1) Outputs of this process are a two-dimensional array
   BlockToPatchMap and its width, BlockToPatchMapWidth, and
   height, BlockToPatchMapHeight, where:
        BlockToPatchMapWidth = Ceil( TileGroupWidth[ tgAddress
   ] ÷ PatchPackingBlockSize )
        BlockToPatchMapHeight = Ceil( TileGroupHeight[ tgAddre
   ss ] ÷ PatchPackingBlockSize )
2) All elements of BlockToPatchMap are first initialized to −1 as
   follows:
   for( y = 0; y < BlockToPatchMapHeight; y++ )
        for( x = 0; x < BlockToPatchMapWidth; x++ )
             BlockToPatchMap[ y ][ x ] = −1
3) Then the BlockToPatchMap array is updated as follows:
   for( patchIdx = 0; patchIdx < PfduTotalNumberOfPatches; p
   atchIdx++ ) {
        mode = atgdu_patch_mode[ patchIdx ]
        if ((( atgh_type == I_TILE_GRP ) && ( mode != I_RAW )
   && ( mode != I_EOM )) ||
             (( atgh_type == P_TILE_GRP ) && (mode != P_RAW) &&
   ( mode != P_EOM ) ||
                  ( atgh_type == SKIP_TILE_GRP )) {
        xOrg = Patch2dPosX[ patchIdx ] / PatchPackingBlockSize
        yOrg = Patch2dPosY[ patchIdx ] / PatchPackingBlockSize
        for( y = 0; y < Patch2dSizeX [ patchIdx ]/
   PatchPackingBlockSize ; y++)
             for( x = 0; x < Patch2dSizeY[ patchIdx ]
   / PatchPackingBlockSize ;x++) {
                  if(( asps_patch_precedence_order_flag == 0) ||
                  ( BlockToPatchMap[ yOrg + y ][ xOrg + x ] == −1))
                  BlockToPatchMap[ yOrg + y ][ xOrg + x ] = patchIdx
                  }
             }
        }
   }
```

In the above pseudocode(1) of Table 1, the first section of code defines the width and height of the BlockToPatch Map 2D array based on the size of the coded atlas tile and the block size. The second section of pseudocode(1) sets an initial value (e.g., −1) for the blocks to indicate that the block is unoccupied. The third section of the pseudocode(1), for the patches in the coded atlas data, uses the x and y positions of the block and the patch width and patch height to set the patch index value for the blocks in the BlockToPatchMap 2D array that is covered by the patch.

In some examples, the atlas generator 102 generates atlas data instance (e.g., a patch index per block) as shown with respect to pseudocode provided in Table 2. In the pseudocode of Table 2, the atlas data is again DecoderToPatchMap [y][x]. In some examples, the format for BlockToPatchMap is assigned to be 16-bit unsigned, and the default value of each sample of BlockToPatchMap[y][x], which is maintained if no patch overwrites the value, is changed, relative to the pseudocode of Table 1, from −1 to 0xFFFF (or 65535).

TABLE 2

Pseudocode(2)

```
1) Outputs of this process are a two-dimensional array
   BlockToPatchMap and its width, BlockToPatchMapWidth, and
   height, BlockToPatchMapHeight, where:
        BlockToPatchMapWidth = Ceil( TileGroupWidth[ tgAddress
   ] ÷ PatchPackingBlockSize )
        BlockToPatchMapHeight = Ceil( TileGroupHeight[ tgAddre
   ss ] ÷ PatchPackingBlockSize )
2) All elements of BlockToPatchMap are first initialized to −1 as
   follows:
   for( y = 0; y < BlockToPatchMapHeight; y++ )
        for( x = 0; x < BlockToPatchMapWidth; x++ )
             BlockToPatchMap[ y ][ x ] = 0xFFFF
```

TABLE 2-continued

Pseudocode(2)

```
3) Then the BlockToPatchMap array is updated as follows:
        for( patchIdx = 0; patchIdx < PfduTotalNumberOfPatches; p
    atchIdx++ ) {
                mode = atgdu_patch_mode[ patchIdx ]
        if ((( atgh_type == I_TILE_GRP ) && ( mode != I_RAW )
    && ( mode != I_EOM )) ||
            (( atgh_type == P_TILE_GRP ) && (mode != P_RAW) &&
    ( mode != P_EOM ) ||
                ( atgh_type == SKIP TILE GRP )) {
    xOrg = Patch2dPosX[ patchIdx ] / PatchPackingBlockSize
    yOrg = Patch2dPosY[ patchIdx ] / PatchPackingBlockSize
    for( y = 0; y < Patch2dSizeX [ patchIdx ]/
    PatchPackingBlockSize ; y++)
    for( x = 0; x < Patch2dSizeY[ patchIdx ] / PatchPackingBloc
    kSize ;x++) {
        if(( asps_patch_precedence_order_flag == 0) ||
        ( BlockToPatchMap[ yOrg + y ][ xOrg + x ] == 0xFFFF))
        BlockToPatchMap[ yOrg + y ][ xOrg + x ] = patchIdx
            }
        }
    }
}
```

In the above pseudocode(2) of Table 2, the first section of code defines the width and height of the BlockToPatch Map 2D array based on the size of the coded atlas tile and the block size. The second section of pseudocode(2) sets an initial value (e.g., 0xFFFF) for the blocks to indicate that the block is unoccupied. The third section of the pseudocode(2), for the patches in the coded atlas data, uses the x and y positions of the block and the patch width and patch height to set the patch index value for the blocks in the BlockTo-PatchMap 2D array that is covered by the patch.

The example atlas generator 102 outputs the atlas data to the example volumetric video encoder 104 and the example hash generator 106 of encoding system 101.

The volumetric video encoder 104 of the encoding system 101 of FIG. 1 encodes the texture and depth atlases into a coded texture and depth bitstream representative of the atlases, and outputs the encoded data to the example multiplexer 108 of encoding system 101. In some examples, the volumetric video encoder 104 encodes the texture and depth atlases based on a standards compliant coding such as HEVC to generate a standards compliant bitstream. In the illustrated example, the volumetric video encoder 104 encodes the atlas data to generate encoded atlas data and includes the encoded atlas data into a coded atlas data bitstream representative of the atlas data and outputs the coded atlas data bitstream to the example multiplexer 108. In some examples, the volumetric video encoder 104 encodes the atlas data based on a standards compliant coding such as HEVC to generate a standards compliant bitstream.

The hash generator 106 of the encoding system 101 of FIG. 1 generates, using the atlas data, a hash value using any one or more suitable hash operations such as a 16-byte message digest algorithm 5 (MD5) hash, a cyclic redundancy check (CRC) hash, a checksum hash, etc. After the hash generator 106 hashes the atlas data, the hash generator 106 signals (e.g., includes or embeds) the hashed atlas data into one or more SEI messages. The hash generator 106 may generate the SEI message to include the hashed atlas data or may receive a generated SEI message from another component and include the hashed atlas data in the already generated SEI message. The example hash generator 106 outputs the SEI message including the hashed atlas data to the multiplexer 108 of encoding system 101. In some examples, the hash generator 106 includes a single hash value for a single atlas data instance in the atlas data hash SEI message. In some examples, the hash generator 106 includes multiple hash values for multiple atlas data instances (e.g., with respective hash values being indexed to particular atlas data instances) in the atlas data hash SEI message. In some examples, the hash generator 106 includes persistence data corresponding to the atlas data instances in the SEI message, as further described below. In some examples, the hash generator 106 generates a hash value for each atlas data instance. In some examples, the hash generator 106 generates the hash values for some atlas data instances such as a single instance in a group of pictures (GOP) such that hash value verification is intermittently provided with respect to the transmitted bitstream.

The multiplexer 108 of encoding system 101 of FIG. 1 combines or multiplexes the coded texture and depth bitstream, the coded atlas data bitstream, and the atlas data hash SEI messages. The encoding system 101 transmits the resultant bitstream to decoding system 110 or memory for eventual use by decoding system 110. In some examples, the multiplexer 108 transmits the resultant bitstream to the decoding system 110 using an interface (e.g., the interface 420 of FIG. 4). In such examples, the interface 420 may transmit the resultant bitstream to the decoding system 110 via a wired or wireless connection (e.g., via Bluetooth, via the Internet, via a local network, via Wi-Fi, etc.).

The decoding system 110 (also referred to as decoder, decoding device, etc.) of FIG. 1 obtains the bitstream via the demultiplexer 112 of the decoding system 110. In some examples, the demultiplexer 112 obtains the bitstream via an interface (e.g., the interface 520 of FIG. 5). The decoding system 110 may be implemented via a client system and encoding system 101 may be implemented via a server or source system. The demultiplexer 112 of decoding system 110 demultiplexes or parses the received bitstream to generate (e.g., extract) (a) a coded texture and depth bitstream, including a coded representation of the texture and depth video and expected to match the coded texture and depth bitstream described with respect to encoding system 101, (b) a coded atlas data bitstream, which is expected to match the atlas data generated by encoding system 101, and (c) one or more atlas data hash SEI messages from the obtained bitstream data. The coded texture and depth bitstream, coded atlas data bitstream, and atlas data hash SEI messages may be characterized as decoder-side coded texture and depth bitstream, coded atlas data bitstream, and atlas data hash SEI messages. The coded texture and depth bitstream, the coded atlas data bitstream, and the atlas data hash SEI messages replicate their counterparts at encoder system 101 when there are no bitstream errors corresponding to decoding and/or transmitting of the bitstream. However, due to bitstream corruption, transmission failure, and/or other reasons, a mismatch may occur.

The example volumetric video decoder 114 of decoding system 110 of FIG. 1 receives (e.g., obtains) and decodes the coded texture, the depth bitstream, the coded atlas data bitstream (e.g., to generate decoded texture atlases, depth atlases, and/or corresponding atlas data instances). The volumetric video decoder 114 transmits the decoded data to the data reconstructor 116 of decoding system 110. The volumetric video decoder 114 decodes the coded texture to generate decoded texture values, the coded depth to generate decoded depth values, the coded atlas data bitstream to generate a decoded atlas data bitstream, the depth atlases, and/or corresponding atlas data instances based on the encoding technique used by the volumetric video encoder 104.

The data reconstructor 116 of FIG. 1 reconstructs a decoded version of the input views provided to encoding system 101 using the decoded texture atlases, decoded depth atlases, and decoded atlas data. For example, the data reconstructor 116 of decoding system 110 may perform the inverse operations of the atlas generator 102 of encoding system 101 to generate the reconstructed views, which may be used to generate a viewport view for a user.

The example hash generator 118 of FIG. 1 obtains the decoded atlas data from the volumetric video decoder 114. The decoding system 110 attempts to replicate the atlas data generated at encoding system 101, which may be decoded at decoding system 110 such that the encoder-side hashed atlas data and the decoder-side hashed atlas data match (e.g., if there are no decoding errors). However, as described above, bitstream corruption and/or transmission failure, and/or a failure of the volumetric video decoder 114 of decoding system 110, may cause a mismatch between the encoder-side atlas data and the decoder-side atlas data. As further described below, the comparator 120 can compare the encoder-side hash values with the decoder-side hash values to determine any mismatch.

The hash generator 118 of FIG. 1 generates, for an atlas data instance, a hash value by applying the same hash operation(s) as the hash generator of encoding system 101 to the same atlas data (e.g., which matches when there is no decoding/transmission error or does not match when there is a decoding/transmission error). The applicable hash operations(s) may be a default hash operations(s) corresponding to a coding standard, an applicable hash operations(s) signaled in the atlas data hash SEI message, or the like. For each hash value generated by the hash generator of decoding system 110, a comparison is made (by the comparator 120) between the decoder-side hash value (e.g., the hash value generated at the decoder) and the encoder-side hash value (e.g., the hash value received in the hash SEI message).

The example comparator 120 of FIG. 1 compares the decoder-side hash (e.g., from the hash generator 118) with the encoder-side hash (e.g., from the demultiplexer 112). If the comparator 120 determines that the two hash values match, the decoding system 110 (e.g., a client system) determines with a high certainty that the received bitstream was not corrupted and that the operation of the volumetric video decoder 114 with respect to the atlas data (e.g., metadata) was conformant to the bitstream and/or the applicable video coding standard such as V3C/V-PCC or MIV. If the comparator 120 determines that any two hash values do not match, the comparator 120 outputs an error flag that indicates a corrupt bitstream or non-conforming decoder operation. In some examples, the comparator 120 outputs an error flag per atlas data instance. The error flag per atlas data instance is a value that identifies a match or mismatch between the hash values (e.g., a '1' for match or '0' for mismatch or vice versa). In some examples, the comparator 120 outputs an error flag per atlas data instance failure when a mismatch is detected (and otherwise a match is presumed).

Below is an example syntax and semantics for implementing atlas data hash value based verification. In some examples, a syntax element that signals the number of atlases (e.g., atlas data instances) is included in the SEI message. In some examples, for each atlas, a hash value is signaled. The example hash generators 106, 118 each generate the hash value using a 16-byte MD5 sum, a CRC, checksum, or another type of hash value. The hash value determination is further described below, in which, in some examples, each of the two bytes of the 16-bit unsigned BlockToPatchMap[y][x] value is input in sequence to the hash computation. The two bytes may be used to represent the patch identifier, when the number of patches is limited to 2^16 (e.g., 16 bits or 2 bytes is sufficient to represent the patch identifier). In such examples, the hash calculation can be performed on the bytes.

In some examples, the bitstreams for MIV and VPCC include VPCC units. The VPCC units include a header and payload information. The header includes a vuh_atlas_id syntax element that indicates the atlas ID to which the payload applies. The MIV standard supports a "common atlas", which includes data that may apply to all atlases. In some examples, if the SEI message is present in the "common atlas" it may contain hash data for multiple atlases. In some examples, a separate SEI message may be used for each atlas, which has the same value of vuh_atlas_id as the associated atlas. When hash data is signaled for more than one atlas, the atlas_id value for which each hash applies is explicitly signaled.

In some examples, atlas data is consistent over multiple access units, and the proposed SEI hash data may persist until cancelled. Persistence may be signaled either for the entire SEI message, which may include data for multiple atlases, or individually per atlas. In some examples, if a persistence flag value is set to 1 (or some other value), the hash value persists for future access units in the bitstream until a cancel flag value is set to 1 (or some other value) or until an instantaneous random access point (IRAP) atlas is present in the bitstream (e.g., because random access decoding may being at an IRAP atlas). As described above, an access unit is a portion of components of the bitstream (e.g., atlas data, texture video, geometry video, occupancy video, etc.) that have the same decoding order count (e.g., data of the V-PCC/MIV bitstream that corresponds to a particular time instance). In some examples, an overall persistence flag and an overall cancel flag are included in the SEI message, which apply to all atlases. In some example, if more than one atlas is indicated, separate persistence and cancel flags per atlas are provided. Accordingly, if the comparator 120 (or another device) generates a flag corresponding to a first access unit in a bitstream, the comparator may generate additional flags for a second (e.g., subsequent) access unit in the bitstream when the message corresponding to the bitstream indicates persistence.

The below Table 3 illustrates an example syntax the example hash generators 106, 118 may use for signaling atlas data hash values and related data such as atlas indicators and persistence flags.

TABLE 3

| Exemplary Syntax | Descriptor |
|---|---|
| decoded_atlas_data_hash( payloadSize ) { | |
|    dadh_cancel_flag | u(1) |
|    if ( !dadh_cancel_flag ) { | |

TABLE 3-continued

Exemplary Syntax

| | Descriptor |
|---|---|
| dadh_persistence_flag | u(1) |
| dadh_num_atlases_minus1 | u(6) |
| for( a = 0; a <= dadh_num_atlases_minus1; a++) { | |
|   if ( dadh_num_atlases_minus1 > 0 ) { | |
|     dadh_atlas_id[ a ] | u(6) |
|     dadh_atlas_cancel_flag[dadh_atlas_id[ a ] ] | u(1) |
|     if ( !dadh_cancel_atlas_flag[dadh_atlas_id[ a ] ] ) | |
|       dadh_atlas_persistence_flag[dadh_atlas_id[ a ] ] | u(1) |
|   } | |
|   if ( !dadh_cancel_atlas_flag[dadh_atlas_id[ a ] ] ) | |
|     for(i=0; i < 16; i++) | |
|       dadh_patch_map_md5[dadh_atlas_id[ a ]][ i ] | b(8) |
|   } | |
| } | |
| } | |

The example syntax and semantics provided in Table 3 signals an atlas data hash value for the decoded atlas data block to patch map for one or more atlases.

The syntax element dadh_cancel_flag is set equal to 1 to indicate that the SEI message cancels the persistence of any previous decoded atlas data hash SEI message in coding order that applies to the current layer. The syntax element dadh_cancel_flag is set equal to 0 to indicate that decoded atlas data hash information follows. The syntax element dadh_persistence_flag is set equal to 1 to indicate that the SEI message specifies the persistence of the decoded atlas data hash SEI message. The syntax element dadh_persistence_flag is set equal to 0 to specify that the decoded atlas data hash SEI message applies to the current decoded access unit only.

In some examples, letting auA be the current access unit, dadh_persistence_flag equal to 1 specifies that the decoded atlas data hash SEI message persists in output order until any of the following conditions are true: (1) a new coded video sequence (CVS) of the current layer begins, (2) the bitstream ends, or (3) an access unit auB in the current layer in an access unit containing a decoded atlas data hash SEI message is output for which FrameOrderCnt(auB) is greater than FrameOrderCnt(auA) (e.g., to determine which access unit correspond to a later video sequence because a higher count corresponds to a later time in the video sequence), where FrameOrderCnt(auB) and FrameOrderCnt(auA) are the FrameOrderCntVal values of auB and auA, respectively, immediately after the invocation of the decoding process for picture order count for auB. The FrameOrderCnt is the order in which frames are coded and/or intended to be displayed. The FrameOrderCnt is used because the order which the frames are coded and/or intended to be displayed may be different from the order which they are present in the bitstream (e . . . , because the encoding system 101 can choose to code frames out of order). The hash value may persist for additional frames when an atlas isn't explicitly signaled for the later frames. The syntax element dadh_num_atlases_minus1 plus 1 specifies the number of atlases or atlas tiles for which hash values are present.

The syntax element dadh_atlas_id[a] specifies the atlas ID of the i-th signaled hash data. In some examples, when not present, the value of dadh_atlas_id[a] is inferred to be equal to vuh_atlas_id.

The syntax element dadh_atlas_cancel_flag[dadh_atlas_id[a]] equal to 1 indicates that the SEI message cancels the persistence of any previous decoded atlas data hash in coding order that applies to the dadh_atlas_id[a]-th atlas. The syntax element dadh_atlas_cancel_flag[dadh_atlas_id [a]] equal to 0 indicates that decoded atlas data hash information follows. for the dadh_atlas_id[a]-th atlas. In some examples, when not present, the value of dadh_atlas_cancel_flag[dadh_atlas_id[a] is inferred to be equal to 0.

The syntax element dadh_atlas_persistence_flag [dadh_atlas_id[a]] specifies the persistence of the decoded atlas data hash SEI message for the atlas with dadh_atlas_id [a]-th atlas. The syntax element dadh_atlas_persistence_flag [dadh_atlas_id[a]] equal to 0 specifies that the decoded atlas data applies to the [dadh_atlas_id[a]]-th atlas of the current access unit only.

In some examples, letting auA be the current picture, dadh_atlas_persistence_flag[dadh_atlas_id[a]] equal to 1 specifies that the decoded atlas data hash SEI message persists for the [dadh_atlas_id[a]]-th atlas in coding order until any of the following conditions are true: (1) a new CLVS of begins, (2) the bitstream ends, or atlas data unit B in an access unit containing a decoded atlas data hash SEI message that is applicable to the dadh_atlasI-d [a]-th atlas is output for which FrameOrderCnt(auB) is greater than FrameOrderCnt(aauA), where FrameOrderCnt(auB) and FrameOrderCnt(auA) are the FrameOrderCntVal values of auB and auA, respectively, immediately after the invocation of the atlas data decoding process for atlas frame order count for au B.

In some examples, prior to computing the hash value, the hash generator 106, 118 arrange the atlas block patch map data into a string of bytes called btpmData of length dataLen as follows in Pseudocode (3):

TABLE 4

Pseudocode (3)

```
iLen = 0
for( y = 0; y < BlockToPatchMapHeight; y++ ) {
    for( x = 0; x < BlockToPatchMapWidth ; x++ ) {
```

TABLE 4-continued

Pseudocode (3)

```
        btpmData[ iLen++ ] = BlockToPatchMap[ y ][ x ] & 0xFF
        btpmData[ iLen++ ] = (BlockToPatchMap[ y ][ x ] >> 8 ) & 0xFF
      }
    }
dataLen = iLen
```

The syntax element dadh_patch_map_md5[i] is the 16-byte MD5 hash of the BlockToPatchMap[ ][ ] variable for the atlas in the current access unit with the value of vuh_atlas_id equal to dadh_atlas_id. The value of dadh_patch_map_md5 [i] shall be equal to the value of digestVal obtained as follows in Pseudocode (4), using the MD5 functions defined in IETF RFC 1321.

TABLE 5

Pseudocode (4)

```
MD5Init( context )
MD5Update( context, btpmData, dataLen )
MD5Final( digestVal, context )
```

Although illustrated with respect to a 16-byte MD5 hash, any suitable hash operations(s) and values may be implemented (e.g., such as a cyclic redundancy check, and a checksum).

In operation, at the encoding system 101, the atlas generator 102 may generate atlas data (e.g., an atlas data instance, file, or mapping) based on multiple input views such that the atlas data indicates patch source data for patches of a corresponding texture atlas and/or depth atlas. For example, the atlas generator 102 may generate the atlas data to include an indicator for each pixel of the texture atlas and/or depth atlas indicating a source patch, a source view, and/or a source location for the pixel such that the source patch, source view, and source location are relative to a source view of the multiple views. The hash generator 106 may generate a hash value based on the atlas data using one or more corresponding hash operations(s). For example, the atlas data may be scanned from a 2D array to a 1D array and the hash generator 106 may apply one or more hash operations(s) may the scanned 1D array. The hash generator 106 may code the hash value and, optionally, additional hash values for other atlas data, into a hash value message such as an atlas data hash SEI message for transmission to the decoding system 110. In some examples, the multiplexer 108 includes (e.g., combines) the atlas data hash SEI message into a bitstream that also includes bitstream portions corresponding to a coded texture atlas, a coded depth atlas, and a coded version of the atlas data. The coded texture atlas, the coded depth atlas, and the coded atlas data may be coded by the volumetric video encoder 104. The coded texture atlas, the coded depth atlas, and the coded atlas data may be coded by the volumetric video encoder 104 to provide a structure to reconstruct the multiple input views. In some examples, the hash generator 106 includes, in the atlas data hash SEI message, a hash operation indicator indicative of one or more hash operation used to generate the hash value. In some examples, the hash generator includes an indicator to cancel persistence of previous atlas data or to initiate persistence of current atlas data in the atlas data hash SEI message. In some examples, the hash generator 106 includes an indicator of the number of atlases and hash values provided and one or more indices to index the hash values and atlases in the atlas data hash SEI message.

At the decoding system 110, an interface of the decoding system 110 obtains a bitstream including bitstream portions representative of the coded texture atlas, the coded depth atlas, and the coded atlas data and an atlas data hash value message such as an atlas data hash SEI message, which may include any data corresponding to the encoder. The volumetric video decoder 114 decodes the bitstream portions to generate a decoded texture atlas, a decoded depth atlas, and decoded atlas data (e.g., an atlas data instance, file, or mapping). The volumetric video decoder 114 applies the same hash operation(s) as the encoder (e.g., selected based on a hash operation indicator signaled in the atlas data hash SEI message) to the decoded atlas data to generate a decoder-side hash value. The comparator 120 compares the encoder-side hash value obtained in the atlas data hash SEI message to the decoder-side hash value. When the comparator 120 determines that the encoder-side hash value matches the decoder-side hash value (as generated at the hash generator 118), the comparator 120 may output an indicator to the data reconstructor 116 to release the decoded atlas data for use in generating a view (e.g., representative of a viewport in the reconstructed multiview) for presenting to a user using the decoded texture atlas, decoded depth atlas, and decoded atlas data. When the comparator 120 determines that the encoder-side hash value does not match the decoder-side hash value, the comparator 120 outputs an indicator (e.g., an error flag) to indicate the mismatch and the decoder may prevent presentation of the view, request a new copy of the relevant bitstream, attempt a revised decode of the received bitstream, discard the obtained data, send an indication to a user, etc.

While an example manner of implementing the encoding system 101 and/or the decoding system 110 of FIG. 1 is illustrated in FIG. 1, one or more of the elements, processes and/or devices illustrated in FIG. 1 may be combined, divided, re-arranged, omitted, eliminated and/or implemented in any other way. Further, the example atlas generator 102, the example volumetric video encoder 104, the example hash generator 106, the example multiplexer 108, and/or, more generally, the example encoding system 101 of FIG. 1 and/or the example de-multiplexer 112, the example volumetric video decoder 114, the example hash generator 118, the example data reconstructor 116, the example comparator 120, and/or, more generally, the example decoding system 110 of FIG. 1 may be implemented by hardware, software, firmware and/or any combination of hardware, software and/or firmware. Thus, for example, any of the example atlas generator 102, the example volumetric video encoder 104, the example hash generator 106, the example multiplexer 108, and/or, more generally, the example encoding system 101 of FIG. 1 and/or the example de-multiplexer 112, the example volumetric video decoder 114, the example hash generator 118, the example data reconstructor 116, the example comparator 120, and/or, more generally, the example decoding system 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example atlas generator 102, the example volumetric video encoder 104, the example hash generator 106, the example multiplexer 108, and/or, more generally, the example encoding system 101 of FIG. 1 and/or the example de-multiplexer 112, the example volumetric video decoder 114, the example hash generator 118, the example data reconstructor 116, the example comparator 120, and/or, more generally, the example decoding system 110 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example encoding system 101 and/or the example decoding system 110 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
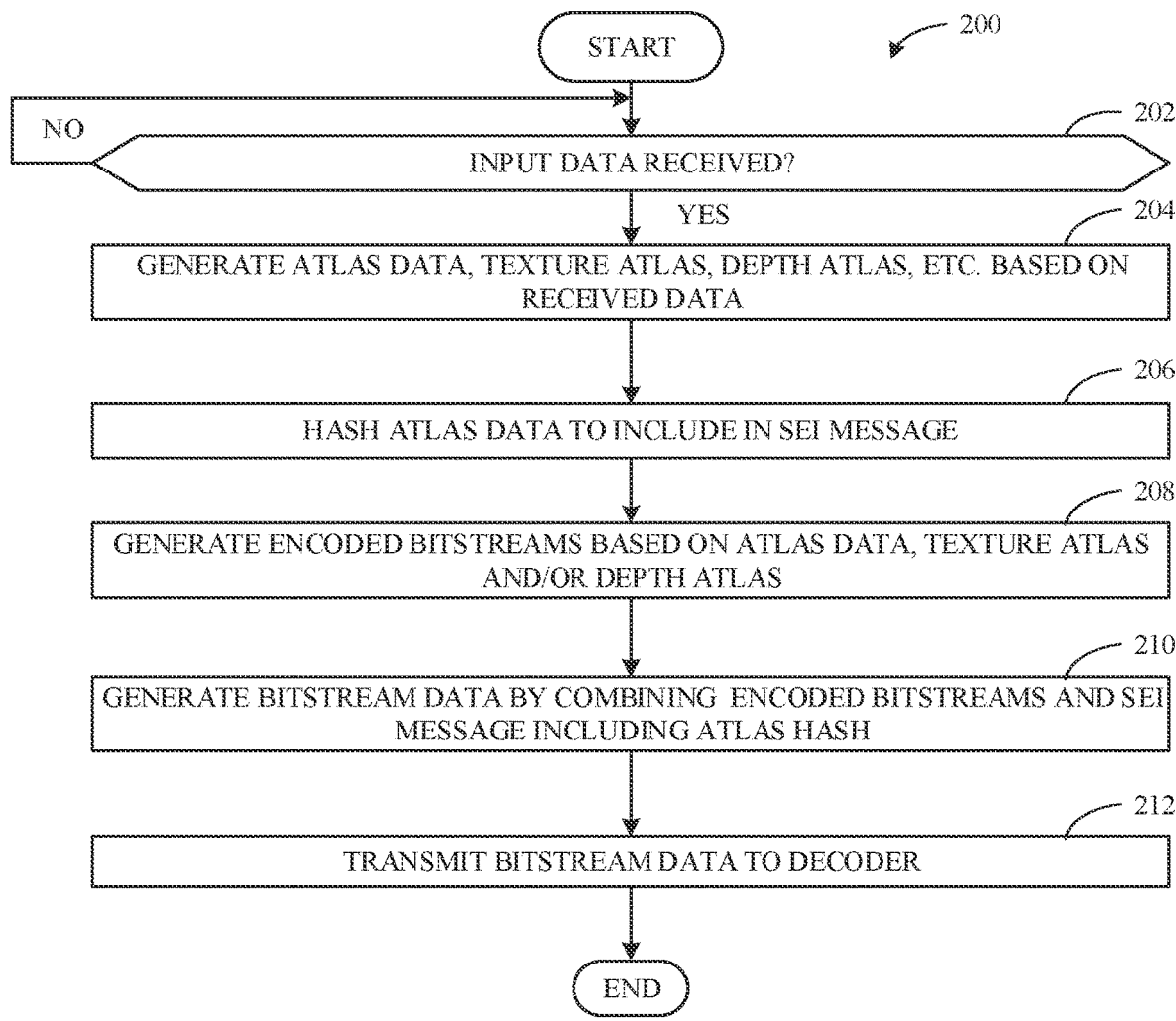
FIG. 2 is a flowchart representative of machine readable instruction which may be executed to implement an example encoding system of FIG. 1.
Figure 3:
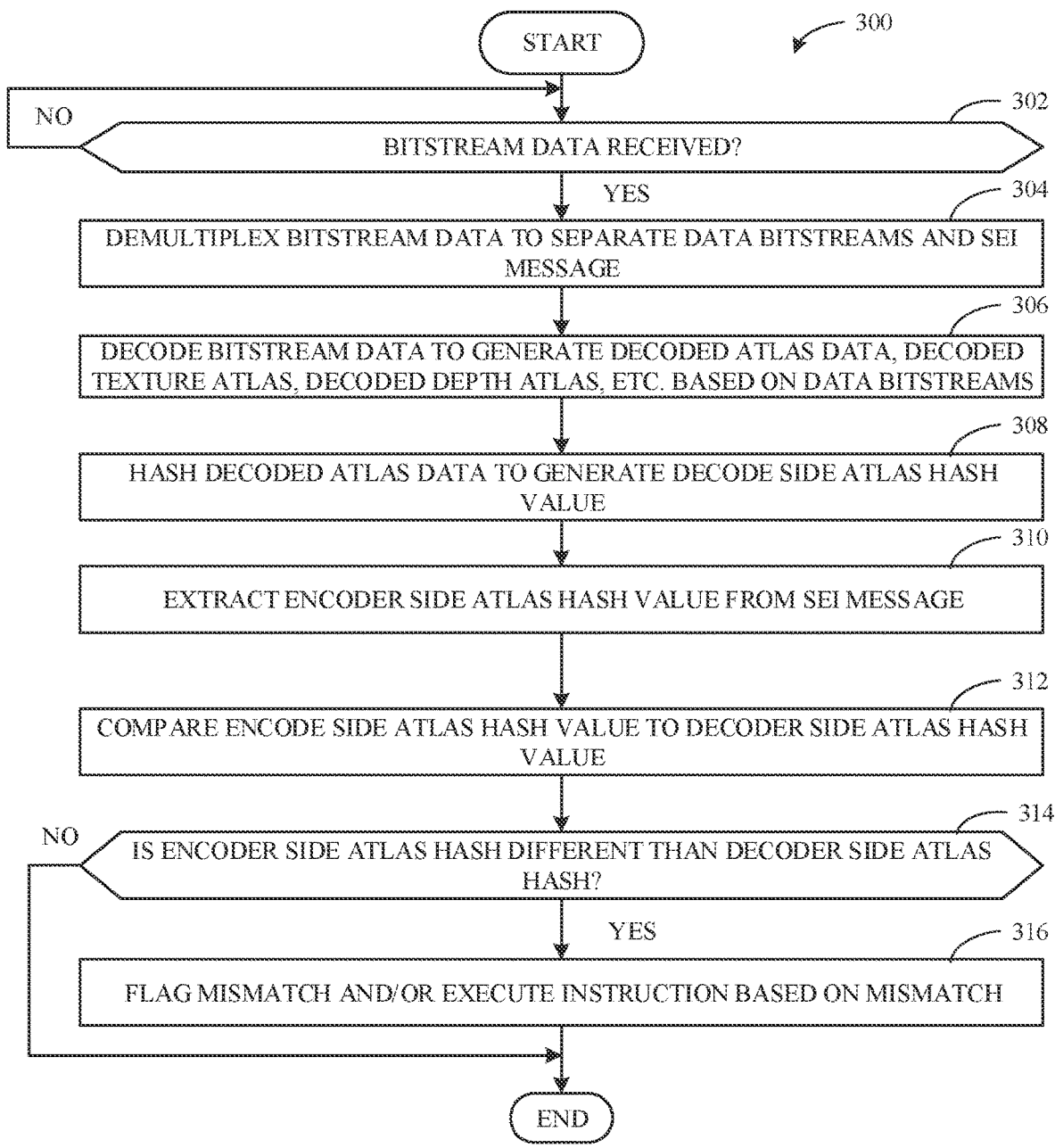
FIG. 3 is a flowchart representative of machine readable instruction which may be executed to implement an example decoding system of FIG. 1.

Flowcharts representative of example hardware logic, machine readable instructions, hardware implemented state machines, and/or any combination thereof for implementing the encoding system 101 and/or the decoding system 110 of FIG. 1 are shown in FIGS. 2 and 3. The machine readable instructions may be one or more executable programs or portion(s) of an executable program for execution by a computer processor such as the processor 412, 512 shown in the example processor platform 400, 500 discussed below in connection with FIGS. 4 and 5. The program may be embodied in software stored on a non-transitory computer readable storage medium such as a CD-ROM, a floppy disk, a hard drive, a DVD, a Blu-ray disk, or a memory associated with the processor 412, 512 but the entire program and/or parts thereof could alternatively be executed by a device other than the processor 412, 512 and/or embodied in firmware or dedicated hardware. Further, although the example program is described with reference to the flowchart illustrated in FIGS. 4 and 5, many other methods of implementing the example encoding system 101 and/or the decoding system 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 2 and 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 2 is a flowchart representative of example machine readable instructions 200 which may be executed to implement the example encoding system 101 to generate a bitstream with an SEI message including hashed atlas data that can be used by the encoding system 101 to ensure that the encoding system 101 is decoding properly. Although the instructions 200 are described in conjunction with the example encoding system 101 of FIG. 2, the instructions 200 may be described in conjunction with any type of encoding system.

At block 202, atlas generator 102 determines if input data is received or obtained. The input data is video image data for corresponding to one or more views of an image to be displayed as part of a video. The input data may be obtained from a processor, storage, a sensor, a video generating device, etc. If the example atlas generator 102 determines that the input data has not been received (block 202, NO), control returns to block 202 until input data is received (e.g., obtained). If the example atlas generator 102 determines that the input data has been received (block 202: YES), the example atlas generator 102 generates atlas data, texture atlas data, depth atlas data, etc. (e.g., using a V3C or MIV encoder) based on the received input data (block 204). For example, the atlas generator 102 may generate the atlas data using a 2 dimensional array variable (e.g., the above defined BlockToPatchMap[y][x]).

At block 206, the example hash generator 106 hashes the atlas data and includes the hashed atlas data into an SEI message. In some examples, the hash generator 106 also includes the hash protocol in the SEI message (e.g., so the decoding system 110 can hash the bitstream using the same hash protocol). As described above, the hash generator 106 may generate the SEI message and/or may obtain the SEI message from another component and include (e.g., embed) the hashed atlas data into the SEI message. The hash generator 106 may generate the hash of the atlas data using a 16-byte MD5 hash, a cyclic redundancy check (CRC) hash, a checksum hash, and/or any other type of hash protocol. At block 208, the example volumetric video encoder 104 generates encoded bitstreams (e.g., encoded bitstream data) based on the atlas data, the texture atlas data, and/or the depth atlas data by encoding and/or compressing the atlas data, the texture atlas data, and/or the depth atlas data. The volumetric video encoder 104 can use any type of atlas encoding, video encoding technique, atlas compression, and/or video compression technique.

At bock 210, the example multiplexer 108 generates the bitstream data by combining the encoded bitstreams of the example volumetric video encoder 104 and the SEI message including the hashed atlas data from the example hash generator 106. The example multiplexer 108 can combine the two signals using any type of multiplexing protocol. At block 212, the example multiplexer 108 transmits the bitstream data to the decoding system 110. For example, the multiplexer 108 may output the bitstream data signal to an interface (e.g., the example interface 420 of FIG. 4) to output to the decoding system 110 via a wired or wireless connection.

FIG. 3 is a flowchart representative of example machine readable instructions 300 which may be executed to implement the example decoding system 110 to generate a bitstream with an SEI message including hashed atlas data that can be used by the decoding system 110 to ensure that the decoding system 110 is decoding properly and/or that the bitstream did not contain any errors. Although the instructions 300 are described in conjunction with the example decoding system 110 of FIG. 1, the instructions 300 may be described in conjunction with any type of decoding system.

At block 302, the demultiplexer 112 determines if bitstream data is received or obtained from the encoding system 101. As described above, the bitstream data included encoded video data and corresponding SEI messages. The demultiplexer 112 may obtain the bitstream data from an interface (e.g., the interface 520 of FIG. 5) which receives the bitstream via a wired or wireless connection. If the example demultiplexer 112 determines that the bitstream data has not been received (block 302, NO), control returns to block 302 until bitstream data is received (e.g., obtained). If the example demultiplexer 112 determines that the bitstream data has been received (block 302: YES), the example demultiplexer 112 demultiplexes (e.g., separates and/or parses) the bitstream data to separate the data bitstreams and the SEI message from the bitstream data (block 304).

At block 306, the example volumetric video decoder 114 decodes the bitstream data to generate decoded atlas data, decoded texture atlas data, decoded depth atlas data, etc. using the bitstream data (e.g., using a V3C or MIV decoder). The example volumetric video decoder 114 decodes the data using a decoding technique corresponding to the technique used to encode the data (e.g., the technique used by the volumetric video encoder 104). At block 308, the example hash generator 118 hashes the decoded atlas data to generate a decoder-side atlas hash value. The example hash generator 118 hashes the decoded atlas data using the same technique used to hash the atlas data at the encoding system 101. In this manner, if the decoder-side hash value matches the encoded side hash value (e.g., from the obtained SEI message), the decoding system 110 determines that a decoding error occurred. In some examples, the hash generator 118 extracts the hash protocol from the SEI message.

At block 310, the example comparator 120 extracts, or otherwise obtains, the encoded side atlas hash value from the SEI message. As described above, the encoding system 101 performs one or more hash operations on the atlas data during the encoding process and transmits the encoder-side hashed atlas as part of the SEI message. At block 312, the example comparator 120 compares the encoder-side atlas hash value (e.g., determined at the encoding system 101 and extracted from the SEI message) with the decoder-side atlas hash value (e.g., the hash value generated by the hash generator 118 at the decoding system 110). As described above, the example comparator 120 compares the encoder-side atlas hash value with the decoder-side atlas value to determine whether the accurate transferring of a bitstream and/or decoding of a bitstream was performed.

At block 314, the example comparator 120 determines if the encoder-side atlas hash value is different than the decoder-side atlas hash value. Because the encoder-side atlas hash value and the decoder-side atlas hash value are hashed using the same hashing protocol and the atlas data is supposed to be the same, the encoder-side hash value and the decoder-side hash values will be the same unless there was a transmission error or a decoding error. Accordingly, if the example comparator 120 determines that the encoder-side atlas hash value is different than the decoder-side atlas hash value (block 314: YES), the example comparator 120 flags the mismatch (e.g., outputs a value indicative of the mismatch) and/or executes an instruction based on the mismatch (block 316) because the decoding system 110 determines that there was a transmission and/or decoding error when the two hashed atlases values are different. For example, the output of the comparator 120 can cause the mismatch to be reflected at a user interface to inform the user of the decoding error. The error flag may be sent to another processor or component to perform an action corresponding to the mismatch. In some examples, the error flag may be output to the data reconstructor 116 and/or another device to cause the corresponding data to be discarded. In some examples, the comparator 120, the data reconstructor 115, and/or another device may determine if the obtained bitstream data and/or the SEI message includes a value indicative of persistence. If the example the comparator 120, the data reconstructor 115, and/or the other device determines that the obtained bitstream data includes a value indicative of persistence, the comparator 120 device flags the corresponding access units corresponding to the bitstream as having errors.

If the example comparator 120 determines that the encoder-side atlas hash value is not different than the decoder-side atlas hash value (block 314: NO), control ends because the decoding system 110 determines that the bitstream was accurately decoded. In some examples, the output of the comparator 120 is sent to the data reconstructor 116. In this manner, the data reconstructor 116 can determine whether to discard the decoded atlas data and/or reconstruct the decoded atlas data into reconstructed views based on the result of the comparator 120 (e.g., initiating matching or mismatching).

Figure 4:
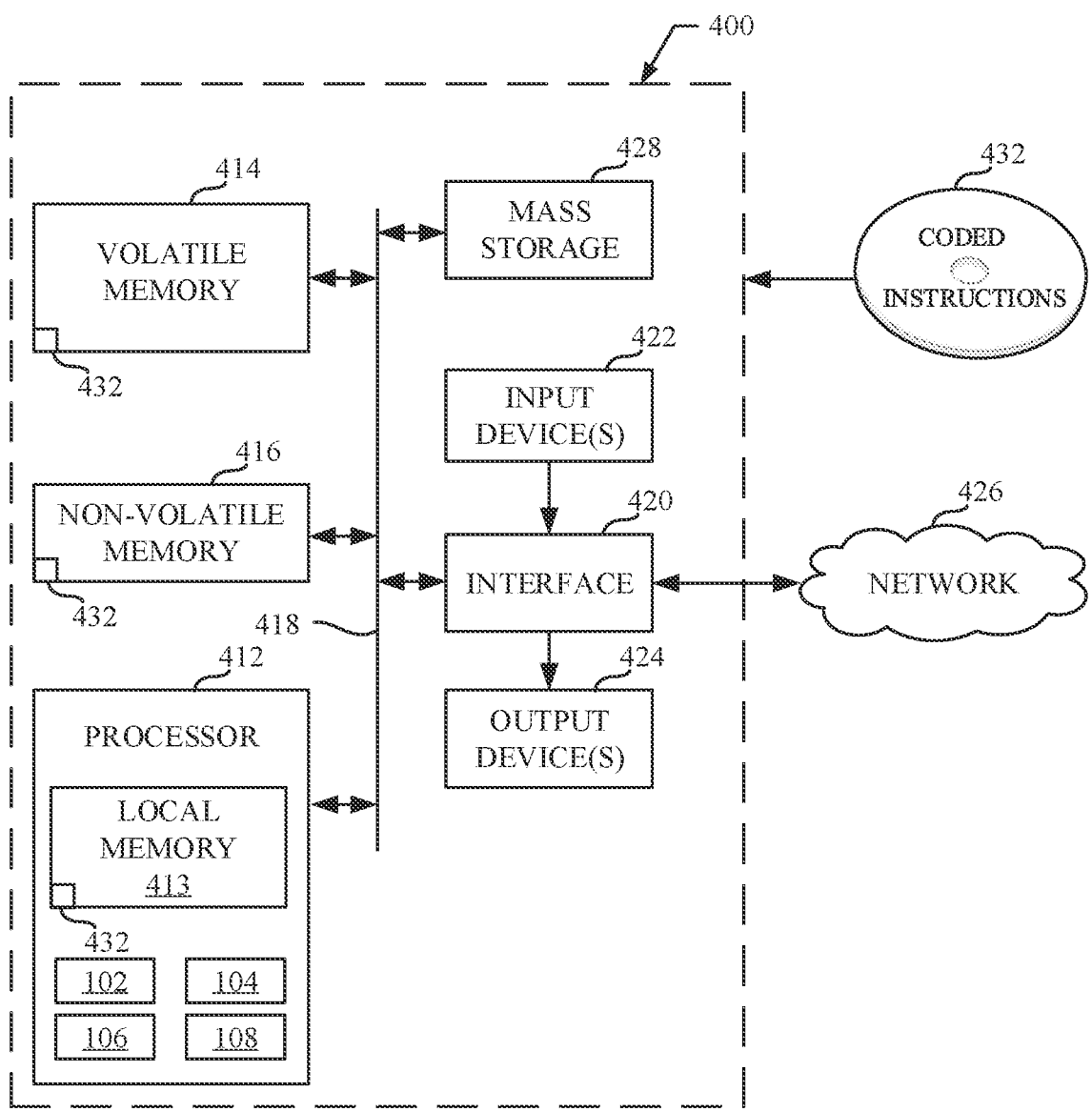
FIG. 4 is a block diagram of an example processing platform structured to execute the instructions of FIG. 3 to implement the encoding system of FIG. 1.

FIG. 4 is a block diagram of an example processor platform 400 structured to execute the instructions of FIG. 2 to implement the encoding system 101 of FIG. 1. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the atlas generator 102, the volumetric video encoder 104, the hash generator 106, and the multiplexer 108 of FIG. 1.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIG. 2 may be stored in the mass storage device 428, in the volatile memory 414, in the non-volatile memory 416, and/or on a removable non-transitory computer readable storage medium such as a CD or DVD.

Figure 5:
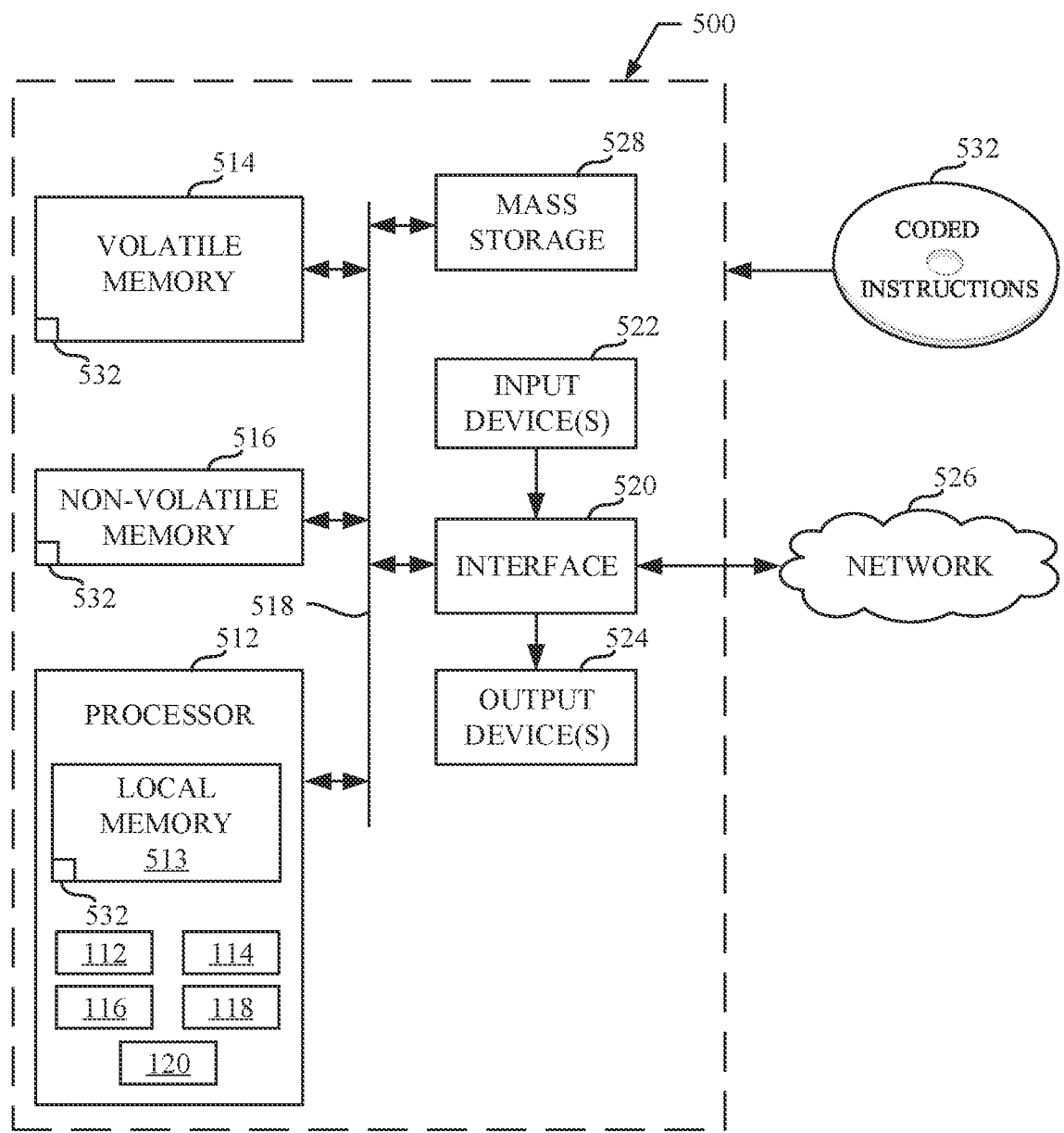
FIG. 5 is a block diagram of an example processing platform structured to execute the instructions of FIG. 3 to implement the decoding system of FIG. 1.

FIG. 5 is a block diagram of an example processor platform 500 structured to execute the instructions of FIG. 3 to implement the decoding system 110 of FIG. 1. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example demultiplexer 112, the example volumetric video decoder 114, the example data reconstructor 116, the example hash generator 118, and the example comparator 120 of FIG. 1.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIG. 3 may be stored in the mass storage device 528, in the volatile memory 514, in the non-volatile memory 516, and/or on a removable non-transitory computer readable storage medium such as a CD or DVD.

Example methods, apparatus, systems, and articles of manufacture to identify a video decoding error are disclosed herein. Further examples and combinations thereof include the following: Example 1 includes an video encoding apparatus comprising an atlas generator to generate atlas data for one or more atlases generated from input views of video, a hash generator to perform a hash operation on the atlas data to generate a hash value, and include the hash value in a message, and a multiplexer to combine the one or more atlases, coded atlas data corresponding to the atlas data, and the message to generate a video bitstream.

Example 2 includes the apparatus of example 1, further including an interface to transmit the bitstream data to a decoding device.

Example 3 includes the apparatus of example 1, wherein the atlas data includes a variable two-dimensional array corresponding to a block to patch map of the input views.

Example 4 includes the apparatus of example 1, wherein the atlas data corresponds to a mapping of blocks to corresponding patches.

Example 5 includes the apparatus of example 1, wherein the atlas generator is to convert the input views of the video into at least one of a texture atlas or a depth atlas, and encode the at least one of the texture atlas, the depth atlas, or the atlas data to generate encoded bitstream data.

Example 6 includes the apparatus of example 1, wherein the hash generator is to at least one of generate the message or obtain the message from another device.

Example 7 includes the apparatus of example 1, wherein the hash generator is to hash the atlas data using a 16 byte message digest algorithm 5 (MD5) sum.

Example 8 includes a non-transitory computer readable storage medium comprising instructions which, when executed, cause one or more processors to at least generate atlas data for one or more atlases generated from input views of video, perform a hash operation on the atlas data to generate a hash value, include the hash value in a message, and combine the one or more atlases, coded atlas data corresponding to the atlas data, and the message to generate a video bitstream.

Example 9 includes the computer readable storage medium of example 8, wherein the instructions cause the one or more processors to transmit the bitstream data to a decoding device.

Example 10 includes the computer readable storage medium of example 8, wherein the atlas data is a variable two-dimensional array corresponding to a block to patch map of the input views.

Example 11 includes the computer readable storage medium of example 8, wherein the atlas data corresponds to a mapping of blocks in an atlas space to corresponding patches.

Example 12 includes the computer readable storage medium of example 8, wherein the instructions cause the one or more processors to convert the input views of the video into at least one of a texture atlas or a depth atlas, and encode the at least one of the texture atlas, the depth atlas, or the atlas data to generate encoded bitstream data.

Example 13 includes the computer readable storage medium of example 8, wherein the instructions cause the one or more processors to at least one of generate the message or obtain the message from another device.

Example 14 includes the computer readable storage medium of example 8, wherein the instructions cause the one or more processors to hash the atlas data using a 16 byte message digest algorithm 5 (MD5) sum.

Example 15 includes a video encoding method comprising generating, by executing an instructions with a processor, atlas data for one or more atlases generated from input views of video, performing, by executing an instructions with the processor, a hash operation on the atlas data to generate a hash value, and including, by executing an instructions with the processor, the hash value in a message, and combining, by executing an instructions with the processor, the one or more atlases, coded atlas data corresponding to the atlas data, and the message to generate a video bitstream.

Example 16 includes the method of example 15, further including transmitting the bitstream data to a decoding device.

Example 17 includes the method of example 15, wherein the atlas data is a variable two-dimensional array corresponding to a block to patch map of the input views.

Example 18 includes the method of example 15, wherein the atlas data corresponds to a mapping of blocks to corresponding patches.

Example 19 includes the method of example 15, further including converting the input views of the video into at least one of a texture atlas or a depth atlas, and encoding the at least one of the texture atlas, the depth atlas, or the atlas data to generate encoded bitstream data.

Example 20 includes the method of example 15, further including at least one of generating the message or obtaining the message from another device.

Example 21 includes the method of example 15, further including hashing the atlas data using a 16 byte message digest algorithm 5 (MD5) sum.

Example 22 includes a video decoding apparatus comprising a hash generator to perform a hash operation on atlas data to determine a first hash value of the atlas data, the atlas data decoded from a volumetric video bitstream, a comparator to compare the first hash value to a second hash value of the atlas data, the second hash value included in the video bitstream, and generate an error flag when the first hash value does not match the second hash value.

Example 23 includes the apparatus of example 22, further including a demultiplexer to obtain the video bitstream, and separate the atlas data and a message from the bitstream.

Example 24 includes the apparatus of example 23, wherein the message includes the second hash value.

Example 25 includes the apparatus of example 22, wherein the hash generator is to generate the first hash value using a same hash operation used to generate the second hash value.

Example 26 includes the apparatus of example 22, wherein the demultiplexer is to obtain the bitstream from an encoder via a network interface.

Example 27 includes the apparatus of example 22, wherein the error flag is to identify that an error has occurred in at least one of transmission of the video bitstream or decoding of the bitstream.

Example 28 includes the apparatus of example 22, wherein the error flag is a first error flag corresponding to a first access unit, the comparator to generate a second error flag for second access unit in the bitstream when the message indicates persistence.

Example 29 includes the apparatus of example 22, wherein the error flag is to cause at least one of an error to be displayed on a user interface, the video bitstream to be discarded, or a new copy of the video bitstream to be requested.

Example 30 includes the apparatus of example 22, wherein the atlas data includes a patch index for a block of data.

Example 31 includes a non-transitory computer readable storage medium comprising instructions which, when executed, cause one or more processors to at least perform a hash operation on atlas data to determine a first hash value of the atlas data, the atlas data decoded from a video bitstream, compare the first hash value to a second hash value of the atlas data, the second hash value included in the video bitstream, and generate an error flag when the first hash value does not match the second hash value.

Example 32 includes the computer readable storage medium of example 31, wherein the instruction cause the one or more processors to at least obtain the video bitstream, and separate the atlas data and a message from the bitstream.

Example 33 includes the computer readable storage medium of example 32, wherein the message includes the second hash value.

Example 34 includes the computer readable storage medium of example 31, wherein the instruction cause the one or more processors to at least generate the first hash value using a same hash operation used to generate the second hash value.

Example 35 includes the computer readable storage medium of example 31, wherein the instruction cause the one or more processors to at least obtain the bitstream from an encoder via a network interface.

Example 36 includes the computer readable storage medium of example 31, wherein the error flag is to identify that an error has occurred in at least one of transmission of the video bitstream or decoding of the bitstream.

Example 37 includes the computer readable storage medium of example 31, wherein the error flag is a first error flag corresponding to a first access unit, the instructions to cause the one or more processors to generate a second error flag for second access unit in the bitstream when the message indicates persistence.

Example 38 includes the computer readable storage medium of example 31, wherein the error flag is to cause at least one of an error to be displayed on a user interface, the video bitstream to be discarded, or a new copy of the video bitstream to be requested.

Example 39 includes the computer readable storage medium of example 31, wherein the atlas data includes a patch index for a block of data.

Example 40 includes a video decoding method comprising performing, by executing an instruction with a processor, a hash operation on atlas data to determine a first hash value of the atlas data, the atlas data decoded from a video bitstream, comparing, by executing an instruction with the processor, the first hash value to a second hash value of the atlas data, the second hash value included in the video bitstream, and generating, by executing an instruction with the processor, an error flag when the first hash value does not match the second hash value.

Example 41 includes the method of example 40, further including obtaining the video bitstream, and separating the atlas data and a message from the bitstream.

Example 42 includes the method of example 41, wherein the message includes the second hash value.

Example 43 includes the method of example 40, further including generating the first hash value using a same hash operation used to generate the second hash value.

Example 44 includes the method of example 40, further including obtaining the bitstream from an encoder via a network interface.

Example 45 includes the method of example 40, wherein the error flag is to identify that an error has occurred in at least one of transmission of the video bitstream or decoding of the bitstream.

Example 46 includes the method of example 40, wherein the error flag is a first error flag corresponding to a first access unit, further including generating a second error flag for second access unit in the bitstream when the message indicates persistence.

Example 47 includes the method of example 40, wherein the error flag is to cause at least one of an error to be displayed on a user interface, the video bitstream to be discarded, or a new copy of the video bitstream to be requested.

Example 48 includes the method of example 40, wherein the atlas data includes a patch index for a block of data.

From the foregoing, it will be appreciated that example methods, apparatus and articles of manufacture have been disclosed that identify a video decoding error. The disclosed methods, apparatus and articles of manufacture improve the efficiency of using a computing device by identifying transmission and/or decoding errors corresponding to the transmission and/or decoding of video bitstream data. In this manner, errors can be dealt with based on the preferences of a user. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A video encoding apparatus comprising:
   interface circuitry to obtain input views of video;
   computer readable instructions; and
   at least one processor circuit to be programmed by the computer readable instructions to at least:
     generate mapping data that maps blocks in one or more atlases to patches, the one or more atlases generated from one or more of the input views of video;
     perform a hash operation on the mapping data to generate a hash value;
     include the hash value in a message; and
     combine the one or more atlases and the message to generate a video bitstream.

2. The apparatus of claim 1, wherein one or more of the at least one processor circuit is to transmit the video bitstream to a decoding device.

3. The apparatus of claim 1, wherein the mapping data is a two-dimensional array.

4. The apparatus of claim 1, wherein the mapping data corresponds to a mapping of blocks to corresponding patches.

5. The apparatus of claim 1, wherein the one or more of the at least one processor circuit is to:
   convert the input views of the video into at least one of a texture atlas or a depth atlas; and
   encode the at least one of the texture atlas, the depth atlas, or the mapping data to generate encoded bitstream data.

6. The apparatus of claim 1, wherein one or more of the at least one processor circuit is to at least one of (i) generate the message or (ii) obtain the message from another device.

7. The apparatus of claim 1, wherein one or more of the at least one processor circuit is to hash the mapping data based on a 16 byte message digest algorithm 5 (MD5) sum.

8. A non-transitory computer readable storage medium comprising instructions to cause at least one processor circuit to at least:
   generate mapping data that maps block in one or more atlases to patches, the one or more atlases generated from one or more input views of video;
   perform a hash operation on the mapping data to generate a hash value;
   include the hash value in a message; and
   combine the one or more atlases and the message to generate a video bitstream.

9. The computer readable storage medium of claim 8, wherein the instructions are to cause one or more of the at least one processor circuit to transmit the video bitstream to a decoding device.

10. The computer readable storage medium of claim 8, wherein the mapping data is a two-dimensional array.

11. The computer readable storage medium of claim 8, wherein the mapping data corresponds to a mapping of blocks in an atlas space to corresponding patches.

12. The computer readable storage medium of claim 8, wherein the instructions are to cause one or more of the at least one processor circuit to:
   convert the input views of the video into at least one of a texture atlas or a depth atlas; and
   encode the at least one of the texture atlas, the depth atlas, or the mapping data to generate encoded bitstream data.

13. The computer readable storage medium of claim 8, wherein the instructions are to cause one or more of the at least one processor circuit to at least one of (i) generate the message or (ii) obtain the message from another device.

14. The computer readable storage medium of claim 8, wherein the instructions are to cause one or more of the at least one processor circuit to hash the mapping data based on a 16 byte message digest algorithm 5 (MD5) sum.

15. A video encoding method comprising:
generating, by at least one processor circuit programmed by at least one instruction, mapping data that maps blocks in one or more atlases to patches, the one or more atlases generated from one or more input views of video;
performing, by one or more of the at least one processor circuit, a hash operation on the mapping data to generate a hash value;
including the hash value in a message; and
combining the one or more atlases and the message to generate a video bitstream.

16. The method of claim 15, further including transmitting the video bitstream to a decoding device.

17. The method of claim 15, wherein the mapping data is a two-dimensional array corresponding to a map of the input views.

18. The method of claim 15, wherein the mapping data corresponds to a mapping of blocks to corresponding patches.

19. The method of claim 15, further including:
converting the input views of the video into at least one of a texture atlas or a depth atlas; and
encoding the at least one of the texture atlas, the depth atlas, or the mapping data to generate encoded bitstream data.

20. The method of claim 15, further including at least one of (i) generating the message or (ii) obtaining the message from another device.

21. The method of claim 15, further including hashing the mapping data based on a 16 byte message digest algorithm 5 (MD5) sum.

22. A video decoding apparatus comprising:
interface circuitry to obtain input views of video;
computer readable instructions; and
at least one processor circuit to be programmed by the computer readable instructions to at least:
perform a hash operation on mapping data to determine a first hash value of the mapping data, the mapping data based on a volumetric video bitstream;
compare the first hash value to a second hash value of the mapping data, the second hash value included in the volumetric video bitstream; and
generate an error flag when the first hash value does not match the second hash value.

23. The apparatus of claim 22, wherein the one or more of the at least one processor circuit is to:
obtain the volumetric video bitstream; and
separate the mapping data and a message from the bitstream.

24. The apparatus of claim 23, wherein the message includes the second hash value.

25. The apparatus of claim 22, wherein the one or more of the at least one processor circuit is to generate the first hash value based on a same hash operation used to generate the second hash value.

* * * * *